United States Patent [19]

Yuki et al.

[11] Patent Number: 4,490,160

[45] Date of Patent: Dec. 25, 1984

[54] METHOD FOR ENRICHMENT OF NITROGEN IN AIR BY THE METHOD OF ADSORPTION AND A CARBONACEOUS ADSORBENT SUITABLE THEREFOR

[75] Inventors: Nakaji Yuki; Hiroshi Kitagawa, both of Ibaraki, Japan

[73] Assignee: Agency of Industrial Science and Technology, Tokyo, Japan

[21] Appl. No.: 529,740

[22] Filed: Sep. 6, 1983

Related U.S. Application Data

[63] Continuation-in-part of Ser. No. 354,242, Mar. 3, 1982, abandoned.

[30] Foreign Application Priority Data

Apr. 23, 1981 [JP] Japan ................................ 56-61612

[51] Int. Cl.$^3$ .................... B01D 53/02; B01D 53/04; C01B 31/02; C01B 31/08
[52] U.S. Cl. ............................................ 55/68; 55/74; 423/449; 264/29.4; 264/29.5; 502/418; 502/420; 502/427; 502/437
[58] Field of Search .................. 55/68, 74, 25, 58; 201/6; 502/416-418, 427, 437, 420; 423/445, 449; 264/29.4, 29.5

[56] References Cited

U.S. PATENT DOCUMENTS

| | | | |
|---|---|---|---|
| 3,996,108 | 12/1976 | Joseph | 201/6 |
| 4,124,529 | 11/1978 | Jungten et al. | 252/421 |
| 4,156,595 | 5/1979 | Scott et al. | 201/6 |
| 4,165,220 | 8/1979 | Colletta et al. | 201/5 |
| 4,233,117 | 11/1980 | Jungten et al. | 201/6 |
| 4,264,339 | 4/1981 | Jungten et al. | 55/25 |
| 4,415,340 | 11/1983 | Knoblauch et al. | 55/25 |

FOREIGN PATENT DOCUMENTS

| | | | |
|---|---|---|---|
| 52-58093 | 5/1977 | Japan | 55/68 |
| 53-7702 | 1/1978 | Japan | 201/5 |

*Primary Examiner*—P. E. Konopka
*Attorney, Agent, or Firm*—Brisebois & Kruger

[57] ABSTRACT

The invention provides an improvement in the method for the enrichment of nitrogen in air by the method of selective adsorption of oxygen in air on a carbonaceous adsorbent material. The improvement comprises the use of an adsorbent material prepared in a specific manner in which a pulverized coal char is blended with a limited amount of a sulfite pulp waste liquor and the blend is shaped into granules or pellets followed by carbonization at 300° to 450° C. for 1 to 2 hours. An enriched nitrogen gas containing 1% by volume or less of oxygen can readily be obtained by passing air through a column filled with the adsorbent material.

3 Claims, No Drawings

METHOD FOR ENRICHMENT OF NITROGEN IN AIR BY THE METHOD OF ADSORPTION AND A CARBONACEOUS ADSORBENT SUITABLE THEREFOR

BACKGROUND OF THE INVENTION

This application is a continuation-in-part application from a copending U.S. application Ser. No. 354,242 filed Mar. 3, 1982, now abandoned.

The present invention relates to an improvement in the method of enrichment of nitrogen in air by the method of adsorption and a carbonaceous adsorbent suitable therefor.

Needless to say, there is a growing demand for nitrogen gas or a nitrogen-enriched air, in which the content of oxygen is, for example, 1% by volume or smaller, (referred to as enriched nitrogen gas hereinafter) in various fields of industries, for example, as a shielding gas to prevent explosion. As a trend in recent years, the traditional method for the preparation of such an enriched nitrogen gas by the air separation with liquefaction is under replacement with the adsorption method by use of a suitable adsorbent. Industrial success of the process for the preparation of enriched nitrogen gas, of course, largely depends on the performance of the adsorbent material so that various attempts have been made to obtain an adsorbent material suitable for the purpose. One of the most widely used classes of the adsorbent materials in the nitrogen enrichment is carbonaceous materials and a method has been disclosed, for example, in Japanese Pat. Kokai Nos. 51-50298, 53-81493 and 54-17595 for nitrogen enrichment by use of molecular sieve cokes. No detailed description is, however, given there of the preparation of the molecular sieve cokes so that the method is not subject to industrial evaluation and the efficiency of nitrogen enrichment disclosed there is not always satisfactory. Accordingly, there has been eagerly desired to develop an improved method for the enrichment of nitrogen in air by the adsorption method or to develop a novel and improved carbonaceous adsorbent material capable of exhibiting higher efficiencies when used for the enrichment of nitrogen in air.

SUMMARY OF THE INVENTION

It is therefore an object of the present invention to provide an improvement in the process of enrichment of nitrogen in air by the method of adsorption in which much higher efficiency of nitrogen enrichment can be obtained than in the prior art methods as disclosed so far.

Another object of the present invention is to provide a novel and improved carbonaceous adsorbent material suitable for use as an adsorbent in the enrichment of nitrogen in air by the method of adsorption, with which much higher efficiency of nitrogen enrichment can be obtained than by the use of conventional carbonaceous adsorbent materials.

Thus, the present invention proposes an improvement, in a process for enrichment of nitrogen in air by the preferential adsorption of oxygen in air on a carbonaceous adsorbent material followed by desorption of oxygen therefrom, that the carbonaceous adsorbent material is prepared in a process comprising the steps of:

(a) admixing a powdery coal char with from 10 to 20% by weight as solid of a sulfite pulp waste liquor, (b) shaping the mixture of the powdery coal char and the sulfite pulp waste liquor into pellets or granules, and (c) carbonizing the pellets or granules at a temperature in the range from 300° to 450° C. in a non-oxidizing atmosphere.

Accordingly, the adsorbent material provided by the present invention is a carbonaceous material in the form of pellets or granules prepared in a process comprising the above described steps (a), (b) and (c).

DETAILED DESCRIPTION OF THE PREFERRED EMBODIMENTS

The base material used for the preparation of the adsorbent material in the invention is, as is given above, a finely divided powdery coal char. The local origin of the coal is not limitative and both coking and non-coking coals are suitable as the starting material of the coal char used in the inventive method. Non-coking coals are preferred to coking coals. The temperature of charring of the coal is of some importance and the coal should be charred preferably at a temperature in the range from 600° to 700° C. in an atmosphere lean in oxygen for 1 to 2 hours. The coal char is finely pulverized before blending with the sulfite pulp waste liquor to have a particle size distribution to pass a screen of 100 mesh openings by the Tyler standard. Typical results of chemical assay of such a coal char are as follows: fixed carbon 94.0%; residual volatile matter 4.0%; and ash content 2.0%. Needless to say, the chemical composition of coal chars widely differs depending on the origin of coal and the conditions of charring. It should be noted that such a coal char per se is to some extent effective as an adsorbent material for the enrichment of nitrogen in air though far from satisfactory.

The other starting material used for the preparation of the inventive carbonaceous adsorbent material is a sulfite pulp waste liquor which is produced in large volumes in the pulp industry as an industrial waste of nuisance and available in any desired volume without large expenses. Results of chemical assay of a typical sulfite pulp waste liquor are as follows: solid content 47%; specific gravity 1.26; pH 5.4; and ash content 5.1%.

It is known that such a sulfite pulp waste liquor or lignosulfonate liquor has been used, along with other organic binder materials such as molasses and the like, as a binder for formcokes (see, for example, U.S. Pat. No. 4,156,59) but the role played by the sulfite pulp waste liquor in the present invention seems to be more than a mere binder in view of the teaching in the above referenced patent that the temperature of the heat treatment of the mixture of coal char and the binder should be as high as 3000° F. (1649° C.) in order to obtain sufficient strength of the formcoke while the inventive carbonaceous adsorbent is imparted with sufficient adsorptivity suitable for nitrogen enrichment only when the temperature of carbonization is in the range from 300° to 450° C. or, preferably, in the range from 300° to 420° C. Sulfite pulp waste liquor is preferred to the other organic binders such as molasses in respect of the superior formability of the pellets or granules shaped therewith.

The amount of the sulfite waste liquor to be admixed with the powdery coal char should be determined in consideration of the requirements that the resultant carbonaceous adsorbent may have a satisfactory capacity as an adsorbent for nitrogen enrichment when properly carbonized and that the pellets or granules after carbonization may have sufficient mechanical strength as explained below in order to withstand the mechanical shearing or abrasion in the repeated operations of adsorption and desorption without being pulverized. In this respect, the sulfite waste liquor should be used in an amount in the range from 10 to 20% by weight based on the powdery coal char on the solid basis. When the amount of the sulfite waste liquor is smaller than above, no satisfactory results are obtained in the mechanical strength of the granules or pellets of the carbonaceous adsorbent while the adsorbent material prepared with too much an amount of the sulfite waste liquor over the above given upper limit has a relatively poor capacity for the nitrogen enrichment with no additional increase in the mechanical strength thereof. Furthermore, too much an amount of the sulfite waste liquor is also undesirable due to the stickiness of the granules or pellets before carbonization to form agglomerates during processing. If necessary, a small volume of water may be added to the mixture of the powdery coal char and the sulfite waste liquor in order to facilitate mixing and shaping of the mixture into granules or pellets. Meanwhile, the mechanical strength of carbonaceous granules or pellets here implied is a value of the so-called microstrength obtained, for example, by the method proposed by H. L. Riley in The Gas World, volume 111, page 106 (1939).

The mixture of the powdery coal char and the sulfite waste liquor is then shaped into granules or pellets by use of a suitable granulator or pelletizing machine, if necessary, under spray of a small volume of water. The size of the granules or pellets is of course not limitative depending on the particular application of the adsorbent material but it is usually advantageous to dress or grade the granules or pellets with respect to the particle size distribution using a set of screens of coarser and finer mesh openings to have a particle size distribution in the range of, for example, 1 to 2 mm, 2 to 4 mm or 5 to 8 mm in diameter.

The thus shaped granules or pellets of the mixture of the coal char and the sulfite waste liquor are then dried and heated to effect carbonization at a temperature in the range from about 300° to about 450° C. or, preferably, from 300° to 420° C. for 1 to 2 hours. The temperature of carbonization is important in order to impart excellent adsorbing power to the thus treated granules or pellets. When the temperature is below 300° C., the carbonization of the pellets or granules is incomplete and no well-developed pore structure can be obtained to enhance the adsorption of the oxygen molecules in the air in addition to the poor mechanical strengths of the granules or pellets. On the other hand, an excessively high temperature for carbonization above 450° C. results in a rather decreased adsorptivity. When the time for the heat treatment is less than 1 hour, no well-developed pore structure can be obtained in addition to the poor mechanical strength of the granules or pellets while extension of the time over 2 hours may bring no additional advantages in respect of the improvement of the adsorption performance of the resultant carbonaceous adsorbent materials.

The above mentioned significance of the carbonization temperature on the performance of a carbonaceous adsorbent material for nitrogen enrichment is closely related to the pore diameter of the carbonaceous adsorbent materials prepared at different carbonization temperatures. As is shown later by experimental data, carbonaceous adsorbent materials were prepared by carbonizing pellets of a mixture of 87.0% coal char charred at 650° C. and 13.0% as solid of a sulfite waste liquor at 200°, 300°, 500° and 700° C. for 2 hours and adsorption isotherms of carbon dioxide, ethane, n-butane and isobutane were determined at 25° C., from which the adsorption volume of each gas on each of the adsorbent materials was calculated using the Dubinin's equation:

$$\frac{W}{W_o} = \exp\left[-\left(\frac{A}{E}\right)^2\right].$$

in which $W_o$ is the adsorption volume of a gas in ml/g, W is the volume of adsorption space of the adsorbent in ml/g, E is a characteristic energy and $A = RT \ln p_o$, R, T, $p_o$ and p being the gas constant, temperature of adsorption in K, saturation vapor pressure and vapor pressure at equilibration, respectively.

The results were that the adsorbent carbonized at 300° C., which was the sole adsorbent among the 4 materials above giving satisfactory results in nitrogen enrichment, had substantial adsorption volumes for carbon dioxide and ethane having a molecular diameter of 4.0 Å but very little adsorption volume for n-butane having a molecular diameter of 4.3 Å and no adsorption volume for isobutane having a molecular diameter of 5.0 Å while the adsorbent carbonized at 200° C. had a substantial adsorption volume for carbon dioxide but substantially no adsorption volumes for ethane and butanes and the adsorption volumes for butanes increased when the carbonization temperature of the adsorbent was 500° C. or higher. The above results support a conclusion that the pore diameter of the carbonaceous adsorbent material should distribute within a range of 4.0 to 4.3 Å in order to exhibit highest performance in nitrogen enrichment.

As is understood from the above description, the granulated or pelletized carbonaceous adsorbent material obtained by the inventive method is outstandingly inexpensive due to the inexpensiveness of the starting materials as well as due to the simplicity of the process for preparing the material in which the finely divided coal char is merely blended with a sulfite pulp waste liquor and shaped into granules or pellets followed by carbonization.

Following are the examples to illustrate the method of the present invention in further detail and also to give a support for the excellent performance of the carbonaceous materials prepared by the inventive method as an adsorbent for the nitrogen enrichment in the air.

EXAMPLE 1

A coal char obtained by charring the Yallourn coal, a non-coking coal, at 650° C. and finely pulverized to pass a screen of 100 mesh openings was admixed and thoroughly blended with different amounts of a sulfite waste liquor with addition of a small volume of water and each of the mixtures was shaped into spherical pellets of 1 to 2 mm diameter in a disk-type pelletizing machine followed by drying at 110° C. for 1 hour. The amounts of the sulfite waste liquor as solid in these dried pellets were 7.0%, 9.1%, 13.0% and 16.7%, the balance being the coal char.

The pellets were then subjected to carbonization in a rotary kiln-type carbonization furnace each at 300° C. for 2 hours. The yields of the thus carbonized pellets were 95 to 99% based on the weight of the pellets after the 110° C. drying. The values of the microstrength determined by tne Riley's method were 28%, 72%, 92% and 83% for the carbonized materials obtained from the pellets containing 7.0%, 9.1%, 13.0% and 16.7% of the sulfite waste liquor as solid, respectively.

EXAMPLE 2

The same dried pellets as used in Example 1 compomed of 87.0% of the charred coal and 13.0% of the sulfite waste liquor as solid were carbonized at 200°, 300°, 500° and 700° C. and the adsorption isotherms of carbon dioxide, ethane, n-butane and isobutane were determined at 25° C. on each of these carbonized adsorbent materials from which the adsorption volume of each gas on each of the adsorbents was calculated by use of the Dubinin's equation. The results were as shown in Table 1 below which also includes the results obtained with the coal char as such without addition of the sulfite waste liquor, pelletization and carbonization.

TABLE 1

| Carbonization temperature, °C. | Adsorption volume, ml/g | | | |
|---|---|---|---|---|
| | Carbon dioxide | Ethane | n-Butane | Isobutane |
| —* | 0.191 | 0.162 | 0.050 | 0.003 |
| 200 | 0.170 | 0 | 0 | 0 |
| 300 | 0.170 | 0.174 | 0.003 | 0 |
| 500 | 0.170 | 0.174 | 0.021 | 0.001 |
| 700 | 0.170 | 0.174 | 0.068 | 0.006 |

*Coal char as such

EXAMPLE 3

The same powdery coal char as used in Example 1 was admixed with different amounts of a sulfite waste liquor together with a small volume of water and pelletized into pellets of 1 to 2 mm diameter followed by drying at 110° C. and carbonization at 200° to 500° C. for 1.0 to 2.0 hours as shown in Table 2 below. The performance of these carbonaceous adsorbent materials in nitrogen enrichment of air was evaluated in the following manner.

Two pressure-resistant columns of 23 mm inner diameter and 500 mm length were each filled with about 100 g of one of the carbonaceous materials prepared in the above described manner and connected in parallel. A mass regulator installed on the way of the piping from the united exits of the two columns served to control the flow rate of the gas at the exit to 100 N ml/minute. By use of the electromagnetic valves installed on the ways of the pipings to and from each of the thus connected adsorption columns, the gas flow through the columns was periodically and automatically switched from one of the columns to the other at every 60 seconds interval with introduction of air at 5 kg/cm² pressure thereinto. The operation was carried out at 25° C. throughout.

The concentration of oxygen in the exit gas from the adsorption column was continuously determined by use of an inline digital oxygen analyzer (Model 0260 manufactured by Beckman Japan Co.). Desorption of the oxygen adsorbed on the adsorbent was carried out during the alternate repose times of either one of the two adsorption columns by evacuation witn a vacuum pump although it was a possible way to desorb the oxygen by merely releasing the column to the atmospheric air with operation of the electromagnetic valves.

By virtue of the selective adsorption of oxygen in the air supply on to the carbonaceous adsorbent material, the exit gas coming out of the column was greatly enriched with respect to the nitrogen content. Table 2 below summarizes the results of the oxygen content in the exit gas in % by volume obtained with either one of the carbonaceous adsorbent materials prepared above and the coal chars before the carbonization as such.

TABLE 2

| Experiment No. | Formulation | | Carbonization | | Oxygen content at the column exit, % by volume |
|---|---|---|---|---|---|
| | Coal char, % by weight | Sulfite waste liquor, % by weight as solid | Temperature, °C. | Time, hours | |
| 1 | 100* | — | — | — | 9.0 |
| 2 | 90.9 | 9.1 | 200 | 1.5 | 3.5 |
| 3 | 90.9 | 9.1 | 300 | 1.5 | 0.5 |
| 4 | 90.9 | 9.1 | 400 | 1.5 | 0.8 |
| 5 | 90.9 | 9.1 | 500 | 1.5 | 7.0 |
| 6 | 87.0 | 13.0 | 200 | 2.0 | 5.0 |
| 7 | 87.0 | 13.0 | 300 | 2.0 | 0.7 |
| 8 | 87.0 | 13.0 | 400 | 2.0 | 0.7 |
| 9 | 87.0 | 13.0 | 500 | 2.0 | 7.4 |
| 10 | 83.2 | 16.7 | 200 | 1.5 | 4.0 |
| 11 | 83.2 | 16.7 | 300 | 1.5 | 0.7 |
| 12 | 83.2 | 16.7 | 400 | 1.5 | 0.7 |
| 13 | 83.2 | 16.7 | 500 | 1.5 | 3.8 |

*Coal char as such

EXAMPLE 4

Similar experiments of nitrogen enrichment to Example 3 were undertaken by use of the carbonaceous adsorbent material used in Experiment No. 7 of Example 3. In this case, each of the dual columns had a length of 1460 mm and the flow rate of the gas at the column exit was controlled in the range from 100 to 300 N ml/minute. Desorption of the oxygen adsorbed on the adsorbent was performed by evacuating with a vacuum pump in Experiments No. 14 to No, 16 shown in Table 3 below but vacuum evacuation was omitted and desorption of the adsorbed oxygen was effected only by releasing the column to the atmosphere in Experiment No. 17. The results of the experiments, i.e. the contents of oxygen in the exit gas, are shown in Table 3 below.

TABLE 3

| Experiment No. | Gas flow rate at the column exit, N ml/minute | Oxygen content at the column exit, % by volume |
|---|---|---|
| 14 | 100 | 0.08 |
| 15 | 200 | 0.18 |
| 16 | 300 | 0.38 |
| 17 | 300 (without evacuation) | 0.85 |

As is understood from the above results, much better results are obtained by the increase in the volume of the adsorbent and the evacuation of the columns by use of a vacuum pump for the desorption of the adsorbed oxygen is considerably effective in decreasing the oxygen concentration in the exit gas. This is, however, a matter of energy costs since the cost for the power of the vacuum pump constitutes a substantial portion of the overall costs for the nitrogen enrichment in the PSA process as undertaken here using conventional adsorbent materials and it is a great success of the invention that an enriched nitrogen gas containing as little as 0.85% by volume of oxygen could be obtained even without the use of a vacuum pump with great saving of the energy costs. Much more, the inventive method provides a means for nitrogen enrichment by far advantageous over the traditional method including liquefaction of air from the standpoint of energy saving by virtue of the excellent adsorption performance of the carbonaceous adsorbent materials prepared according to the inventive method very inexpensively.

EXAMPLE 5

The same adsorption-desorption experiment as in Example 3 was repeated except that the carbonaceous adsorbent materials used here were prepared from a coal char of the Akahira coal, a coking coal, instead of the non-coking coal. The adsorbent materials were prepared each from 87% by weight of the coal char and 13% by weight of the sulfite waste liquor as solid and the carbonization of the pellets was performed for 1 hour at varied temperatures of 200° to 1000° C.

Table 4 below gives the results of the oxygen concentrations at the column exit obtained with the adsorbent materials prepared at various carbonization temperatures.

TABLE 4

| Temperature of carbonization, °C. | Oxygen content at the column exit, % by volume |
|---|---|
| —* | 14.6 |
| 200 | 15.5 |
| 300 | 9.6 |
| 400 | 7.6 |
| 500 | 2.8 |
| 600 | 2.8 |
| 700 | 2.3 |
| 800 | 2.4 |
| 1000 | 20.2 |

*Coal char as such

What is claimed is:

1. In a method for the enrichment of nitrogen in air by the selective adsorption of oxygen on a carbonaceous adsorbent material, the improvement that the carbonaceous adsorbent material is prepared by the procedure comprising the steps of:
   (a) charring a non-coking coal at a temperature in the range from 600° to 700° C. for 1 to 2 hours in an atmosphere lean in oxygen to give a coal char;
   (b) pulverizing the coal char;
   (c) blending the pulverized coal char with a sulfite pulp waste liquor in an amount in the range from 10 to 20% by weight as solid based on the pulverized coal char;
   (d) shaping the blend of the pulverized coal char and the sulfite pulp waste liquor into pellets or granules; and
   (e) carbonizing the pellets or granules by heating in a non-oxzidizing atmosphere at a temperature in the range from 300° to 420° C. for 1 to 2 hours.

2. The improvement as claimed in claim 1 wherein the pulverized coal char has a particle size distribution to pass a screen of 100 mesh openings by the Tyler standard.

3. A method for the enrichment of nitrogen in air by the selective adsorption of oxygen on a carbonaceous adsorbent material comprising
   preparing a carbonaceous adsorbent material by the steps of
   (a) charring a non-coking coal at a temperature in the range from 600° to 700° C. for 1 to 2 hours in an atmosphere lean in oxygen to give a coal char;
   (b) pulverizing the coal char;
   (c) blending the pulverized coal char with a sulfite pulp waste liquor in an amount in the range from 10 to 20% by weight as solid based on the pulverized coal char;
   (d) shaping the blend of the pulverized coal char and the sulfite pulp waste liquor into pellets or granules; and
   (e) carbonizing the pellets or granules by heating in a non-oxidizing atmosphere at a temperature in the range from 300° to 420° C. for 1 to 2 hours; and passing air to be nitrogen enriched through the resulting pellets or granules.

* * * * *

UNITED STATES PATENT AND TRADEMARK OFFICE
CERTIFICATE OF CORRECTION

PATENT NO. : 4,490,160
DATED : December 25, 1984
INVENTOR(S) : Nakaji YUKI and Hiroshi KITAGAWA It is certified that error appears in the above-identified patent and that said Letters Patent is hereby corrected as shown below:

On the title page,

Change the Assignee to read as follows:

[73] Assignee: DIRECTOR-GENERAL OF THE AGENCY OF INDUSTRIAL SCIENCE AND TECHNOLOGY, Tokyo, Japan Signed and Sealed this Twenty-third Day of April 1985

[SEAL]

Attest:

DONALD J. QUIGG

Attesting Officer   Acting Commissioner of Patents and Trademarks